(12) United States Patent
Kameda et al.

(10) Patent No.: US 9,475,924 B2
(45) Date of Patent: *Oct. 25, 2016

(54) RUBBER COMPOSITION FOR TIRE TREAD AND PNEUMATIC TIRE USING THE SAME

(71) Applicant: THE YOKOHAMA RUBBER CO., LTD., Minato-Ku, Tokyo (JP)

(72) Inventors: Yoshihiro Kameda, Hiratsuka (JP); Makoto Ashiura, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 231 days.

This patent is subject to a terminal disclaimer.

(21) Appl. No.: 13/627,129

(22) Filed: Sep. 26, 2012

(65) Prior Publication Data

US 2013/0267646 A1    Oct. 10, 2013

(30) Foreign Application Priority Data

Sep. 30, 2011    (JP) ................................ 2011-216768

(51) Int. Cl.
*C08L 9/06* (2006.01)
*C08K 3/04* (2006.01)
(Continued)

(52) U.S. Cl.
CPC ................ *C08L 9/06* (2013.01); *B60C 1/0016* (2013.04); *C08C 19/44* (2013.01); *C08K 3/04* (2013.01); *C08K 3/36* (2013.01); *C08K 5/548* (2013.01); *C08L 15/00* (2013.01)

(58) Field of Classification Search
CPC ........... C08L 9/06; C08L 15/00; C08K 3/04; C08K 3/36; C08K 5/548; B60C 1/0016; C08C 19/44

USPC ................. 524/261, 492, 526, 575
See application file for complete search history.

(56) References Cited

U.S. PATENT DOCUMENTS

2013/0324638 A1\* 12/2013 Naka et al. .................... 523/156
2013/0338255 A1\* 12/2013 Naka et al. .................... 523/155
2014/0011909 A1\* 1/2014 Satou et al. ................... 523/155

FOREIGN PATENT DOCUMENTS

JP    2005263905 A  *  9/2005 .............. C08L 15/00
JP    2006-232917 A      9/2006
(Continued)

OTHER PUBLICATIONS

English machine translation of JP 2005-263905, Sep. 2005.\*
(Continued)

*Primary Examiner* — Angela C Scott
(74) *Attorney, Agent, or Firm* — Carrier Blackman & Associates, P.C.; Joseph P. Carrier; William D. Blackman

(57) ABSTRACT

A rubber composition for tire tread contains a diene-based rubber including 30 wt % or more of a terminal modifying group-containing conjugated diene-based copolymer, silica, carbon black, and at least one of silane coupling agents represented by specified formulae. The total amount of silica and carbon black in the composition is 35 to 140 parts by weight relative to 100 parts by weight of the diene-based rubber, while the silane coupling agent content is 4 to 18 wt % on the silica content. The copolymer is produced by a specified method such that the aromatic vinyl monomer content in the copolymer is 38 to 48 wt %, the vinyl unit content in all the conjugated diene-based monomers is 20 to 35 mol %, the weight average molecular weight of the copolymer is 600,000 to 1,000,000, and the terminal modifying group in the copolymer contains a functional group which interacts with the silica.

8 Claims, 1 Drawing Sheet

(51) Int. Cl.
  *C08K 3/36* (2006.01)
  *C08K 5/548* (2006.01)
  *B60C 1/00* (2006.01)
  *C08C 19/44* (2006.01)
  *C08L 15/00* (2006.01)

(56) References Cited

FOREIGN PATENT DOCUMENTS

| | | |
|---|---|---|
| JP | 2009-263420 A | 11/2009 |
| JP | 2010-155935 A | 7/2010 |
| JP | 2010-260920 A | 11/2010 |
| JP | 2011-006543 A | 1/2011 |

OTHER PUBLICATIONS

Rhodia Silcea News Release for Zeosil Premium, Feb. 20, 2007; http://web.archive.org/web/20110107073322/http://www.rhodia.com/en/news_center/news_releases/rhodia_silcea_launches_zeosil_premium_200108.tcm#.*

JP Office Action issued in corresponding JP patent application on Aug. 6, 2013, with partial English translation thereof.

* cited by examiner

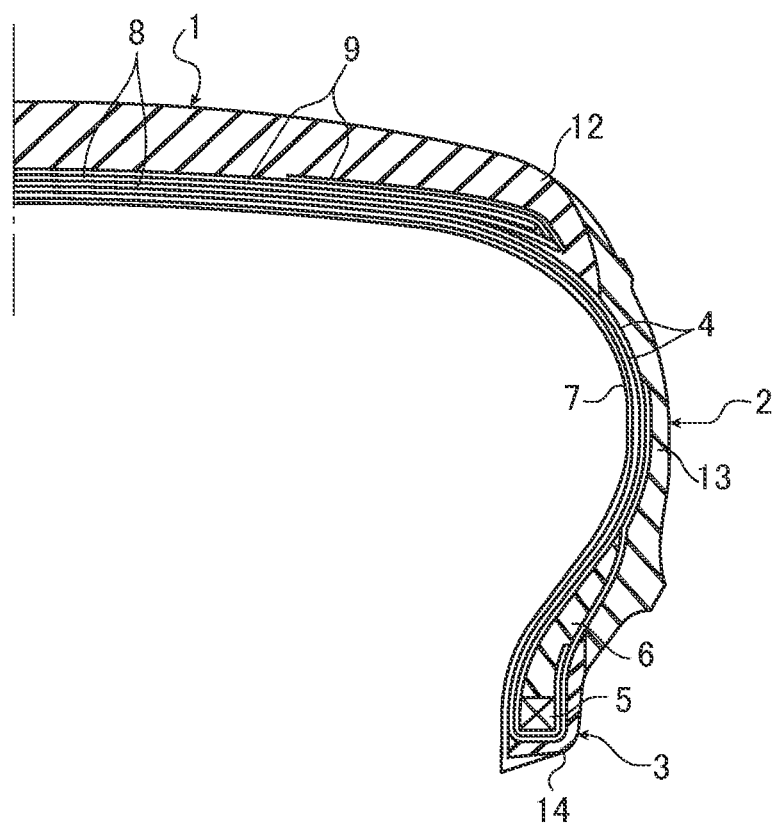

RUBBER COMPOSITION FOR TIRE TREAD AND PNEUMATIC TIRE USING THE SAME

BACKGROUND OF THE INVENTION

This invention relates to a rubber composition for tire tread, and a pneumatic tire using the rubber composition.

Wet silica has been traditionally known as a filler which can achieve a balance between reduced heat generation and the grip properties on wet road surfaces, which are needed by pneumatic tires as required performances. This wet silica has a tendency that particles aggregate as a result of hydrogen bonding between silanol groups, which are the surface functional groups of the wet silica. Thus, since dispersion of wet silica in rubber is deteriorated, a decrease in wear resistance is not avoided, and in order to improve dispersion of silica in rubber, it is necessary to lengthen the kneading time.

In order to ameliorate these defects, silane coupling agents have been developed.

The Yokohama Rubber Co., Ltd. has hitherto proposed a rubber composition for tires, which contains a condensate of 3-octanoylthio-1-propyltriethoxysilane (JP 2006-232917 A).

Furthermore, a rubber composition containing specific silica and a SH-based silane coupling agent having a specific structure in a diene-based rubber has been proposed (for example, JP 2009-263420 A).

SUMMARY OF THE INVENTION

However, only a combination of silica and a silane coupling agent is still insufficient to achieve a good balance between reduction in heat generation and wear resistance, and the performance required by the market cannot be satisfied.

Thus, it is an object of the present invention to provide a rubber composition more reduced in heat generation and improved in wear resistance, and an excellent tire having the advantages described above, which is obtainable by using the rubber composition particularly in the tread.

The inventors of the present invention wholeheartedly conducted an investigation in order to resolve the problems describe above, and as a result, they found that a rubber composition more reduced in heat generation and improved in wear resistance may be obtained by incorporating a modified conjugated diene-based polymer having an excellent interaction with silica, and a silane coupling agent having a specific structure.

Furthermore, the inventors of the present invention found that a rubber composition which comprises a diene-based rubber including 30 wt % or more of a terminal modifying group-containing conjugated diene-based copolymer having modified terminals and obtainable by solution polymerization, silica, carbon black, and at least one of the silane coupling agents represented by the following formulae (a) to (c); and in which the total amount of the silica and the carbon black is 35 parts to 140 parts by weight relative to 100 parts by weight of the diene-based rubber, the amount of the silane coupling agent or agents is 4 wt % to 18 wt % on the amount of the silica, the terminal modifying group-containing conjugated diene-based copolymer is produced by allowing an active conjugated diene-based polymer chain that is obtained by copolymerizing a conjugated diene-based monomer and an aromatic vinyl monomer in a hydrocarbon solvent using an active organometallic compound as an initiator, to react with at least one kind of compound A having a functional group which is capable of reacting with an active terminal of the active conjugated diene-based polymer chain, the aromatic vinyl monomer content in the terminal modifying group-containing conjugated diene-based copolymer is 38 wt % to 48 wt %, the vinyl unit content in all the conjugated diene-based monomers constituting the terminal modifying group-containing conjugated diene-based copolymer is 20 mol % to 35 mol %, the weight average molecular weight of the terminal modifying group-containing conjugated diene-based copolymer is 600,000 to 1,000,000, and the terminal modifying group carried by the terminal modifying group-containing conjugated diene-based copolymer contains a functional group which interacts with the silica, can be a rubber composition for tire tread that is excellent in heat generation reduction and wear resistance, and also found that a pneumatic tire using this rubber composition is excellent in heat generation reduction and wear resistance. Thus, the present invention was accomplished.

[Chemcial Formula 1]

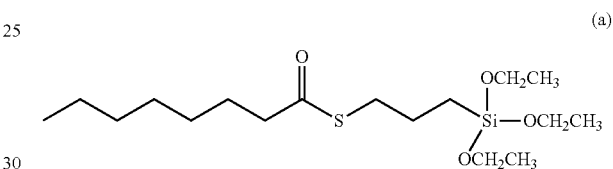

(a)

[Chemcial Formula 2]

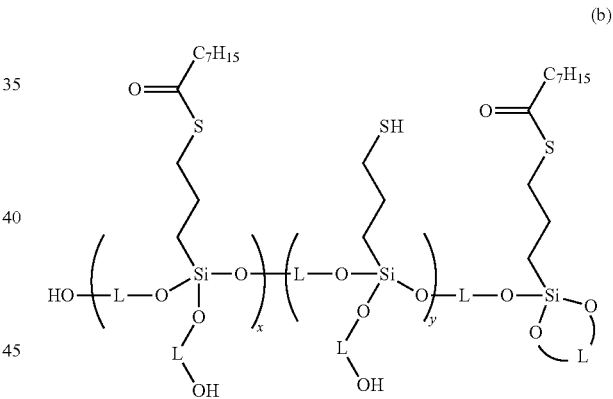

(b)

[In the formula (b), each L independently represents an alkanediyl group or alkenediyl group having 1 to 9 carbon atoms; x represents an integer of 1 to 150; and y represents an integer of 1 to 150].

[Chemical Formula 3]

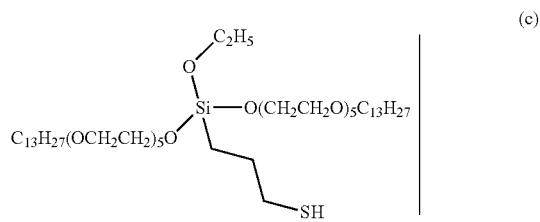

(c)

Specifically, the present invention provides the following items 1 to 8.

1. A rubber composition for tire tread, comprising a diene-based rubber including 30 wt % or more of a terminal modifying group-containing conjugated diene-based copolymer having modified terminals, silica, carbon black, and at least one of silane coupling agents represented by formulae (a) to (c):

[Chemcial Formula 4]

(a)

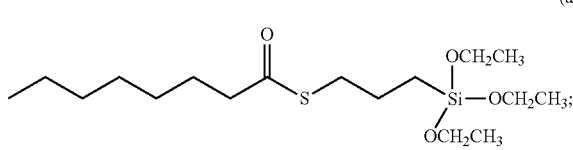

[Chemcial Formula 5]

(b)

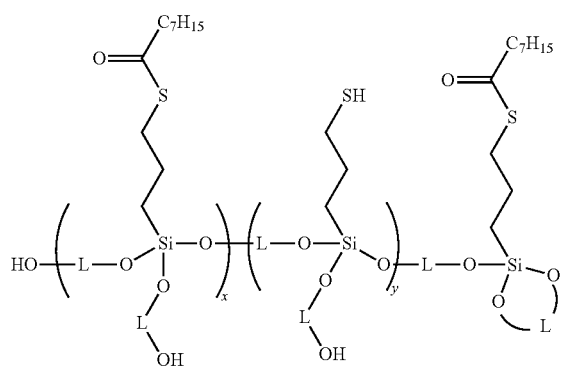

[in the formula (b), each L independently represents an alkanediyl group or alkenediyl group having 1 to 9 carbon atoms; x represents an integer of 1 to 150; and y represents an integer of 1 to 150]; and

[Chemical Formula 6]

(c)

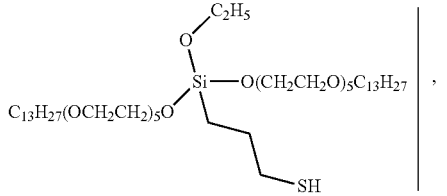

a total amount of the silica and the carbon black being 35 parts to 140 parts by weight relative to 100 parts by weight of the diene-based rubber, an amount of the silane coupling agent or agents being 4 wt % to 18 wt % on an amount of the silica, the terminal modifying group-containing conjugated diene-based copolymer being produced by allowing an active conjugated diene-based polymer chain that is obtained by copolymerizing a conjugated diene-based monomer and an aromatic vinyl monomer by solution polymerization in a hydrocarbon solvent and by using an active organometallic compound as an initiator, to react with at least one kind of compound A having a functional group which is capable of reacting with an active terminal of the active conjugated diene-based polymer chain, an aromatic vinyl monomer content in the terminal modifying group-containing conjugated diene-based copolymer being 38 wt % to 48 wt %, a vinyl unit content in all conjugated diene-based monomers constituting the terminal modifying group-containing conjugated diene-based copolymer being 20 mol % to 35 mol %, the terminal modifying group-containing conjugated diene-based copolymer having a weight average molecular weight of 600,000 to 1,000,000, and a terminal modifying group carried by the terminal modifying group-containing conjugated diene-based copolymer containing a functional group which interacts with the silica.

2. The rubber composition for tire tread according to 1 as above, wherein the amount of the silica is 20 parts to 120 parts by weight relative to 100 parts by weight of the diene-based rubber.

3. The rubber composition for tire tread according to 1 as above, wherein the compound A includes at least one selected from polyorganosiloxane compounds represented by formulae (I) to (III):

[Chemical Formula 7]

(I)

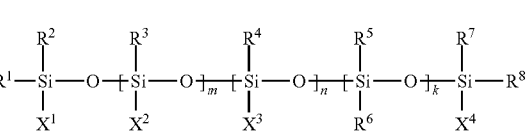

[in the formula (I), $R^1$ to $R^8$ each represent an alkyl group having 1 to 6 carbon atoms or an aryl group having 6 to 12 carbon atoms, while these may be identical to or different from each other; $X^1$ and $X^4$ each represent a group having a functional group which reacts with the active terminal of the active conjugated diene-based polymer chain, or an alkyl group having 1 to 6 carbon atoms or an aryl group having 6 to 12 carbon atoms, while $X^1$ and $X^4$ may be identical to or different from each other; $X^2$ represents a group having a functional group which reacts with the active terminal of the active conjugated diene-based polymer chain; $X^3$ represents a group containing 2 to 20 repeating units of alkylene glycol, or may partly represent a group derived from a group containing 2 to 20 repeating units of alkylene glycol; m represents an integer of 3 to 200; n represents an integer of 0 to 200; and k represents an integer of 0 to 200];

[Chemical Formula 8]

(II)

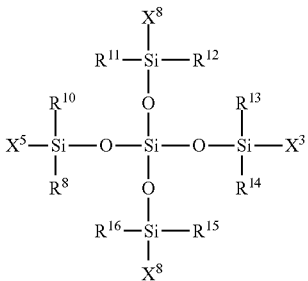

[in the formula (II), $R^9$ to $R^{16}$ each represent an alkyl group having 1 to 6 carbon atoms or an aryl group having 6 to 12 carbon atoms, while these may be identical to or different from each other; and $X^5$ to $X^8$ each represent a group having a functional group which reacts with the active terminal of the active conjugated diene-based polymer chain]; and

[Chemical Formula 9]

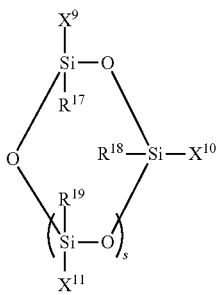

(III)

[in the formula (III), $R^{17}$ to $R^{19}$ each represent an alkyl group having 1 to 6 carbon atoms or an aryl group having 6 to 12 carbon atoms, while these may be identical to or different from each other; and $X^9$ to $X^{11}$ each represent a group having a functional group which reacts with the active terminal of the active conjugated diene-based polymer chain; and s represents an integer of 1 to 18].

4. The rubber composition for tire tread according to 1 as above, wherein the functional group which interacts with the silica is at least one selected from the group consisting of an alkoxysilyl group, a hydroxyl group, an aldehyde group, a carboxyl group, an amino group, an imino group, an epoxy group, an amido group, a thiol group, and an ether group.

5. The rubber composition for tire tread according to 1 as above, wherein the terminal modifying group-containing conjugated diene-based copolymer has, as the functional group which interacts with the silica, a hydroxyl group and at least one selected from the group consisting of an alkoxysilyl group, an aldehyde group, a carboxyl group, an amino group, an imino group, an epoxy group, an amido group, a thiol group, and an ether group.

6. The rubber composition for tire tread according to 1 as above, wherein the diene-based rubber further includes a diene-based rubber other than the terminal modifying group-containing conjugated diene-based copolymer.

7. The rubber composition for tire tread according to 6 as above, wherein the diene-based rubber includes the diene-based rubber other than the terminal modifying group-containing conjugated diene-based copolymer in an amount of 70 wt % or less of a total amount of the diene-based rubber.

8. A pneumatic tire using the rubber composition for tire tread according to 1 as above.

The rubber composition for tire tread of the present invention is excellent in heat generation reduction and wear resistance. The pneumatic tire of the present invention is excellent in heat generation reduction and wear resistance.

BRIEF DESCRIPTION OF THE DRAWINGS

FIG. 1 is a partial cross-sectional view in a tire meridian direction, showing an exemplary embodiment of a pneumatic tire which uses the rubber composition for tire tread of the invention.

DETAILED DESCRIPTION OF THE INVENTION

The present invention will be described in detail below.
The rubber composition for tire tread of the present invention is a rubber composition for tire tread, which comprises a diene-based rubber including 30 wt % or more of a terminal modifying group-containing conjugated diene-based copolymer having modified terminals and being obtainable by solution polymerization, silica, carbon black, and at least one of the silane coupling agents represented by the following formulae (a) to (c); and in which the total amount of the silica and the carbon black is 35 parts to 140 parts by weight relative to 100 parts by weight of the diene-based rubber, the amount of the silane coupling agent or agents is 4 wt % to 18 wt % on the amount of the silica, the terminal modifying group-containing conjugated diene-based copolymer is produced by allowing an active conjugated diene-based polymer chain that is obtained by copolymerizing a conjugated diene-based monomer and an aromatic vinyl monomer in a hydrocarbon solvent using an active organometallic compound as an initiator, to react with at least one kind of compound A having a functional group which is capable of reacting with an active terminal of the active conjugated diene-based polymer chain, the aromatic vinyl monomer content in the terminal modifying group-containing conjugated diene-based copolymer is 38 wt % to 48 wt %, the vinyl unit content in all the conjugated diene-based monomers constituting the terminal modifying group-containing conjugated diene-based copolymer is 20 mol % to 35 mol %, the weight average molecular weight of the terminal modifying group-containing conjugated diene-based copolymer is 600,000 to 1,000,000, and the terminal modifying group carried by the terminal modifying group-containing conjugated diene-based copolymer contains a functional group which interacts with the silica.

[Chemcial Formula 10]

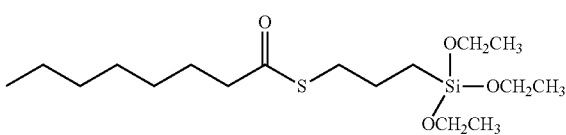

(a)

[Chemcial Formula 11]

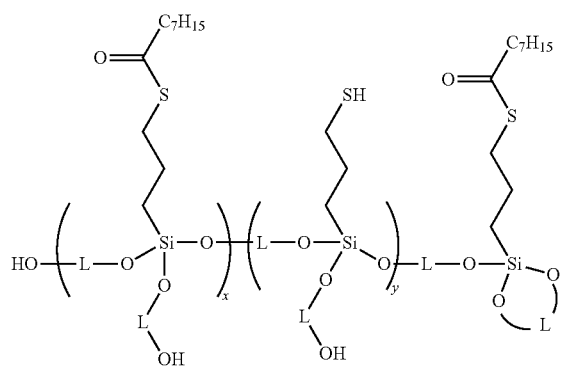

(b)

[In the formula (b), each L independently represents an alkanediyl group or alkenediyl group having 1 to 9 carbon atoms; x represents an integer of 1 to 150; and y represents an integer of 1 to 150].

[Chemical Formula 12]

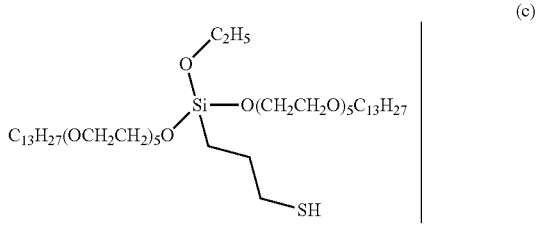

As the rubber composition for tire tread of the present invention comprises a diene-based rubber, silica, carbon black, and a silane coupling agent represented by any one of the formula (a) to formula (c), the affinity between the diene-based rubber and the silica is increased, and thus, dispersibility of the silica is improved. Thereby, heat generation can be decreased, and thus rolling resistance can be reduced. Particularly, by setting the aromatic vinyl unit content to 38 wt % to 48 wt %, the terminal modifying group-containing conjugated diene-based copolymer forms a finely phase-separated form, and also, the terminal modifying group produced by a reaction between an active terminal of the active conjugated diene-based polymer chain and at least one kind of the compound A having a functional group capable of reacting with the active terminal contains a functional group which interacts with silica. Since the concentration of the terminal modifying groups is optimized by adjusting the weight average molecular weight of the terminal modifying group-containing conjugated diene-based copolymer to 600,000 to 1,000,000, the terminal modifying groups act efficiently on the silica, thereby further ameliorating the dispersibility of the silica, and the low rolling resistance of the pneumatic tire can be reduced to a large extent. Furthermore, by increasing the aromatic vinyl unit content of the terminal modifying group-containing conjugated diene-based copolymer, the tire rigidity is increased, and thus the wear resistance performance and steering stability can be improved to a level higher than the conventional level.

Furthermore, in the present invention, it is expected that the terminal modifying group-containing conjugated diene-based copolymer can interact with silica, a specific silane coupling agent can form chemical or physical bonding with silica, and the silane coupling agent bonded to silica can crosslink the terminal modifying group-containing conjugated diene-based copolymer. Such a rubber that is obtainable from the rubber composition for tire tread of the present invention through the crosslinking by a silane coupling agent, is expected to be excellent in heat generation reduction, wear resistance performance and steering stability, and to be able to suppress a decrease in the modulus.

The diene-based rubber will be described below. The diene-based rubber according to the present invention includes 30 wt % or more of a terminal modifying group-containing conjugated diene-based copolymer which has modified terminals (conjugated diene-based polymer rubber having modifying groups at the terminals of the molecular chain).

Since the terminal modifying group-containing conjugated diene-based copolymer is incorporated, the affinity with silica is increased, and the dispersibility of silica is improved. Therefore, the operating effect of the silica is further enhanced, and also, reduction in heat generation and wear resistance performance are excellent, while steering stability is increased.

According to the present invention, the terminal modifying group-containing conjugated diene-based copolymer is produced by allowing an active conjugated diene-based polymer chain that is obtained by copolymerizing a conjugated diene-based monomer and an aromatic vinyl monomer in a hydrocarbon solvent using an active organometallic compound as an initiator, to react with at least one kind of compound A having a functional group which is capable of reacting with an active terminal of the active conjugated diene-based polymer chain.

The skeletal structure of the terminal modifying group-containing conjugated diene-based copolymer is constituted of a copolymer obtainable by copolymerizing a conjugated diene-based monomer and an aromatic vinyl monomer. Examples of the conjugated diene-based monomer include 1,3-butadiene, isoprene (2-methyl-1,3-butadiene), 2,3-dimethyl-1,3-butadiene, 2-chloro-1,3-butadiene, and 1,3-pentadiene. Examples of the aromatic vinyl monomer include styrene, 2-methylstyrene, 3-methylstyrene, 4-methylstyrene, α-methylstyrene, 2,4-dimethylstyrene, 2,4-diisopropylstyrene, 4-tert-butylstyrene, divinylbenzene, tert-butoxystyrene, vinylbenzyldimethylamine, (4-vinylbenzyl)dimethylaminoethyl ether, N,N-dimethylaminoethylstyrene, and vinylpyridine.

The conjugated diene-based copolymer that forms the skeletal structure of the terminal modifying group-containing conjugated diene-based copolymer is preferably such that the terminals are composed of isoprene unit blocks. If the terminals are composed of isoprene unit blocks, when the terminals are modified and silica is incorporated, the affinity of the modified conjugated diene-based polymer and silica is improved, and reduction in heat generation and wear resistance are improved. Therefore, when the conjugated diene monomer unit constituting the polymer contains a conjugated diene other than the isoprene unit, it is preferable to introduce the isoprene unit block to the polymer terminals by adding isoprene to the solution containing the polymer having active terminals, before the compound A having a functional group which is capable of reacting with the active terminals of the active conjugated diene-based polymer chain is added, or during the addition of the compound A in divided portions.

According to the present invention, the conjugated diene-based polymer is produced by copolymerizing the conjugated diene-based monomer and the aromatic vinyl monomer described above by solution polymerization in a hydrocarbon solvent and by using an active organometallic compound as an initiator. The hydrocarbon solvent may be any conventionally used solvent, and examples thereof include cyclohexane, n-hexane, benzene, and toluene.

Regarding the active organometallic compound used, an organic alkali metal compound is preferably used, and examples thereof include organic monolithium compounds such as n-butyllithium, sec-butyllithium, t-butyllithium, hexyllithium, phenyllithium, and stilbene lithium; organic polyvalent lithium compounds such as dilithiomethane, 1,4-dilithiobutane, 1,4-dilithio-2-ethylcyclohexane, and 1,3,5-trilithiobenzene; organosodium compounds such as sodium naphthalene; and organopotassium compounds such as potassium naphthalene. Furthermore, 3,3-(N,N-dimethylamino)-1-propyllithium, 3,3-(N,N-diethylamino)-1-propyllithium, 3-(N,N-diethylamino)-1-propyllithium, 3-(N,N-dipropylamino)-1-propyllithium, 3-morpholino-1-propyllithium, 3-imidazole-1-propyllithium, and organolithium compounds prepared by extending the chains of these compounds by means of one to 10 units of butadiene, isoprene or styrene, can also be used.

Furthermore, in the polymerization reaction, it is also possible to add an aprotic polar compound for the purpose of randomly copolymerizing the aromatic vinyl monomer with the conjugated diene-based monomer. Examples of the aprotic polar compound include ethers such as diethyl ether, diethylene glycol dimethyl ether, tetrahydrofuran, and 2,2-bis(2-oxolanyl)propane; and amines such as triethylamine and tetramethylethylenediamine.

According to the present invention, terminal modifying groups are produced by bonding at least one kind of the compound A having a reactive functional group, to the active terminals of the active conjugated diene-based polymer chain obtained by copolymerizing the conjugated diene-based monomer and the aromatic vinyl monomer by solution polymerization. Here, the compound A having a functional group which is capable of reacting with the active terminals of the active conjugated diene-based polymer chain, may be bonded to at least one active conjugated diene-based polymer chain, and one or more active conjugated diene-based polymer chains can be bonded to one compound. That is, the terminal modifying group-containing conjugated diene-based copolymer used in the present invention can include a modified rubber obtained by introducing modifying groups at both terminals of a conjugated diene-based polymer, a modified rubber in which the modifying groups are optionally bonded to one or more other conjugated diene-based polymers, and a mixture of these plural modified rubbers. Furthermore, the reaction between the active terminals of an active conjugated diene-based polymer chain and a compound A having a functional group which is capable of reacting with these active terminals, can be carried out as a one-stage reaction or a multi-stage reaction. Also, identical or different compounds may be allowed to react in sequence.

According to the present invention, examples of the compound A having a functional group which is capable of reacting with the active terminals of the active conjugated diene-based polymer chain, include a tin compound, a silicon compound, a silane compound, an amide compound and/or an imide compound, an isocyanate and/or an isothiocyanate compound, a ketone compound, an ester compound, a vinyl compound, an oxirane compound, a thiirane compound, an oxetane compound, a polysulfide compound, a polysiloxane compound, a polyorganosiloxane compound, a polyether compound, a polyene compound, a halogen compound, and a compound with fullerene or the like. Among them, a polyorganosiloxane compound is preferred. One kind of compound A may be bonded to the polymer or a combination of plural kinds of compound A may be bonded to the polymer.

Specific examples of the oxirane compound (epoxy resin) as the compound A that is capable of reacting with the active terminals of the active conjugated diene-based polymer chain, include polyglycidyl ethers of polyhydric alcohols, such as ethylene glycol diglycidyl ether and glycerin triglycidyl ether; polyglycidyl ethers of aromatic compounds having two or more phenol groups, such as diglycidylated bisphenol A; polyepoxy compounds such as 1,4-diglycidylbenzene, 1,3,5-triglycidylbenzene, and polyepoxylated liquid polybutadiene; epoxy group-containing tertiary amines such as 4,4'-diglycidyldiphenylmethylamine and 4,4'-diglycidyldibenzylmethylamine; and diglycidylamino compounds such as diglycidylaniline, diglycidyl orthotoluidine, tetraglycidyl meta-xylenediamine, tetraglycidylaminodiphenylmethane, tetraglycidyl-p-phenylenediamine, diglycidylaminomethylcyclohexane, and tetraglycidyl-1,3,-bisaminomethylcyclohexane.

Examples of the silicon compound include tetrachlorosilicon, tetrabromosilicon, methyltrichlorosilicon, butyltrichlorosilicon, dichlorosilicon, and bis(trichlorosilyl)silicon.

Examples of the tin compound include tetrachlorotin, tetrabromotin, methyltrichlorotin, butyltrichlorotin, dichlorotin, and bis(trichlorosilyl)tin.

An example of the silane compound is a silane compound containing at least one selected from an alkoxy group, a phenoxy group and a halogen atom. Examples of such a silane compound include dimethoxydimethylsilane, diphenoxydimethylsilane, diethoxydiethylsilane, triphenoxymethylsilane, triphenoxyvinylsilane, trimethoxyvinylsilane, triethoxyvinylsilane, tri(2-methylbutoxy)ethylsilane, tri(2-methylbutoxy)vinylsilane, triphenoxyphenylsilane, tetraphenoxysilane, tetraethoxysilane, tetramethoxysilane, tetrakis(2-ethylhexyloxy)silane, phenoxydivinylchlorosilane, methoxybiethylchlorosilane, diphenoxymethylchlorosilane, diphenoxyphenyliodosilane, diethoxymethylchlorosilane, dimethoxymethylchlorosilane, trimethoxychlorosilane, triethoxychlorosilane, triphenoxychlorosilane, tris(2-ethylhexyloxy)chlorosilane, phenoxymethyldichlorosilane, methoxyethyldichlorosilane, ethoxymethyldichlorosilane, phenoxyphenyldiiodosilane, diphenoxydichlorosilane, dimethoxydichlorosilane, bis(2-methylbutoxy)dibromosilane, bis(2-methylbutoxy)dichlorosilane, diethoxydichlorosilane, methoxytrichlorosilane, ethoxytrichlorosilane, phenoxytrichlorosilane, (2-ethylhexyloxy)trichlorosilane, and (2-methylbutoxy)trichlorosilane.

Furthermore, the silane compound may have a glycidyl group, an epoxy group, a methacryloxy group and the like as functional groups other than those described above. Examples of such a compound include γ-glycidoxyethyltrimethoxysilane, γ-glycidoxypropyltrimethoxysilane, γ-glycidoxybutyltrimethoxysilane, γ-glycidoxypropyltriethoxysilane, γ-glycidoxypropyltripropoxysilane, γ-glycidoxypropyltributoxysilane, γ-glycidoxypropyltriphenoxysilane, γ-glycidoxypropylmethyldimethoxysilane, γ-glycidoxypropylethyldimethoxysilane, γ-glycidoxypropylethyldiethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldiphenoxysilane, γ-glycidoxypropyldimethylmethoxysilane, γ-glycidoxypropyldiethylethoxysilane, γ-glycidoxypropyldimethylethoxysilane, γ-glycidoxypropyldimethylphenoxysilane, γ-glycidoxypropyldiethylmethoxysilane, γ-glycidoxypropylmethyldiisopropenoxysilane, bis(γ-glycidoxypropyl)dimethoxysilane, bis(γ-glycidoxypropyl)diethoxysilane, bis(γ-glycidoxypropyl)dipropoxysilane, bis(γ-glycidoxypropyl)dibutoxysilane, bis(γ-glycidoxypropyl)diphenoxysilane, bis(γ-glycidoxypropyl)methylmethoxysilane, bis(γ-glycidoxypropyl)methylethoxysilane, bis(γ-glycidoxypropyl)methylpropoxysilane, bis(γ-glycidoxypropyl)methylbutoxysilane, bis(γ-glycidoxypropyl)methylphenoxysilane, tris(γ-glycidoxypropyl)methoxysilane, γ-methacryloxypropyltrimethoxysilane, γ-methacryloxypropyltriethoxysilane, γ-methacryloxymethyltrimethoxysilane, γ-methacryloxyethyltriethoxysilane, bis(γ-methacryloxypropyl)dimethoxysilane, tris(γ-methacryloxypropyl)methoxysilane, β-(3,4-epoxycyclohexyl)ethyltrimethoxysilane, β-(3,4-epoxycyclohexyl)ethyltriethoxysilane, β-(3,4-epoxycyclohexyl)ethyltripropoxysilane, β-(3,4- epoxycyclohexyl)ethyltributoxysilane, β-(3,4-epoxycyclohexyl)ethyltriphenoxysilane, β-(3,4-epoxycyclohexyl)propyltrimethoxysilane, β-(3,4-epoxycyclohexyl)ethylmethyldimethoxysilane, β-(3,4-epoxycyclohexyl)ethylethyldimethoxysilane, β-(3,4-epoxycyclohexyl)ethylethyldiethoxysilane, β-(3,4-epoxycyclohexyl)ethylmethyldiethoxysilane, β-(3,4-epoxycyclohexyl)ethylmethyldipropoxysilane, β-(3,4-epoxycyclohexyl)ethylmethyldibutoxysilane, β-(3,4-epoxycyclohexyl)ethylmethyldiphenoxysilane, β-(3,4-epoxycyclohexyl)ethyldimethylmethoxysilane, β-(3,4-epoxycyclohexyl)ethyldiethylethoxysilane, β-(3,4-epoxycyclohexyl)ethyldimethylethoxysilane, β-(3,4-epoxycyclohexyl)ethyldimethylpropoxysilane, β-(3,4-epoxycyclohexyl)ethyldimethylbutoxysilane, β-(3,4-epoxycyclohexyl)ethyldimethylphenoxysilane, β-(3,4-epoxycyclohexyl)ethyldiethylmethoxysilane, and β-(3,4-epoxycyclohexyl)ethylmethyldiisopropenoxysilane.

Examples of the isocyanate compound or isothiocyanate compound include aromatic polyisocyanate compounds such as 2,4-tolylene diisocyanate, 2,6-tolylene diisocyanate, diphenylmethane diisocyanate, naphthalene diisocyanate, tolidine diisocyanate, triphenylmethane triisocyanate, p-phenylene diisocyanate, tris(isocyanatophenyl)thiophosphate, xylylene diisocyanate, benzene-1,2,4-triisocyanate, naphthalene-1,2,5,7-tetraisocyanate, naphthalene-1,3,7-triisocyanate, phenyl isocyanate, hexamethylene diisocyanate, methylcyclohexane diisocyanate, phenyl-1,4-diisothiocyanate, 2,4-tolylene diisocyanate, diphenylmethane diisocyanate, and naphthalene diisocyanate.

Further examples include N-substituted aminoketones such as 4-dimethylaminobenzophenone, 4-diethylaminobenzophenone, 4-di-t-butylaminobenzophenone, 4-diphenylaminobenzophenone, 4,4'-bis(dimethylamino)benzophenone, 4,4'-bis(diethylamino)benzophenone, 4,4'-bis(di-t-butylamino)benzophenone, 4,4'-bis(diphenylamino)benzophenone, 4,4'-bis(divinylamino)benzophenone, 4-dimethylaminoacetophenone, 4-diethylaminoacetophenone, 1,3-bis(diphenylamino)-2-propanone, and 1,7-bis-(methylethylamino)-4-heptanone, and corresponding N-substituted aminothioketones; N-substituted aminoaldehydes such as 4-diethylaminobenzaldehyde and 4-divinylaminobenzaldehyde, and corresponding N-substituted aminothioaldehydes; N-substituted lactams such as N-methyl-β-propiolactam, N-t-butyl-β-propiolactam, N-phenyl-β-propiolactam, N-methoxyphenyl-β-propiolactam, N-naphthyl-β-propiolactam, N-methyl-2-pyrrolidone, N-t-butyl-2-pyrrolidone, N-phenyl-pyrrolidone, N-methoxyphenyl-2-pyrrolidone, N-vinyl-2-pyrrolidone, N-benzyl-2-pyrrolidone, N-naphthyl-2-pyrrolidone, N-methyl-5-methyl-2-pyrrolidone, N-methyl-3,3'-dimethyl-2-pyrrolidone, N-t-butyl-3,3'-dimethyl-2-pyrrolidone, N-phenyl-3,3'-dimethyl-2-pyrrolidone, N-methyl-2-piperidone, N-t-butyl-2-piperidone, N-phenyl-piperidone, N-methoxyphenyl-2-piperidone, N-vinyl-2-piperidone, N-benzyl-2-piperidone, N-naphthyl-2-piperidone, N-methyl-3,3'-dimethyl-2-piperidone, N-phenyl-3,3'-dimethyl-2-piperidone, N-methyl-ε-caprolactam, N-phenyl-ε-caprolactam, N-methoxyphenyl-ε-caprolactam, N-vinyl-ε-caprolactam, N-benzyl-ε-caprolactam, N-naphthyl-ε-caprolactam, N-methyl-ω-laurolactam, N-phenyl-ω-laurolactam, N-t-butyl-laurolactam, N-vinyl-ω-laurolactam, and N-benzyl-ω-laurolactam, and corresponding thiolactams; N-substituted ethylene ureas such as 1,3-dimethyl-2-imidazolidinone, 1,3-diethyl-2-imidazolidinone, 1,3-dipropyl-2-imidazolidinone, 1-methyl-3-ethyl-2-imidazolidinone, 1-methyl-3-propyl-2-imidazolidinone, 1-methyl-3-(2-ethoxyethyl)-2-imidazolidinone, and 1,3-dimethyl-3,4,5,6-tetrahydropyrimidinone, and corresponding N-substituted thioethylene ureas; benzophenones having at least one amino group, alkylamino group or dialkylamino group on one or both of the benzene rings, such as 4,4'-bis(dimethylamino)-benzophenone, 4,4'-bis(diethylamino)-benzophenone, 4,4'-bis(dibutylamino)-benzophenone, 4,4'-diaminobenzophenone and 4-dimethylaminobenzophenone, and corresponding thiobenzophenones.

A silicon compound containing a halogen atom and/or an alkoxy group is preferably a compound represented by the following formula (IV), and bonding of plural active conjugated diene-based polymer chains to one molecule of this compound is facilitated.

[Chemical Formula 13]

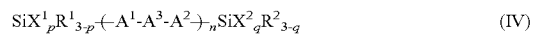

(IV)

[In the formula (IV), $X^1$ and $X^2$ each represent a halogen atom or an alkoxy group having 1 to 20 carbon atoms; p and q each independently represent an integer of 0 to 3; the total number of the halogen atoms and alkoxy groups having 1 to 20 carbon atoms in the compound represented by the formula (IV) is 5 or greater; $R^1$ and $R^2$ each represent a monovalent hydrocarbon group having 1 to 20 carbon atoms; n represents an integer of 0 to 20; $A^1$ and $A^2$ each independently represent a single bond or a divalent hydrocarbon having 1 to 20 carbon atoms; $A^3$ represents a divalent group represented by formula: $-(SiX^3_rR^3_{2-r})_m-$, $-NR^4-$, or $-N(-A^4-SiX^4_sR^5_{2-s})-$; $X^3$ and $X^4$ each represent a halogen atom or an alkoxy group having 1 to 20 carbon atoms; $R^3$ and $R^5$ each represent a monovalent hydrocarbon group having 1 to 20 carbon atoms; $R^4$ represents a hydrogen atom or a monovalent hydrocarbon group having 1 to 20 carbon atoms; $A^4$ represents a single bond or a divalent hydrocarbon group having 1 to 20 carbon atoms; r represents an integer of 0 to 2; m represents an integer of 0 to 20; and s represents an integer of 0 to 3].

Examples of the compound represented by the formula (IV) include halogenated silicon compounds such as hexachlorodisilane, bis(trichlorosilyl)methane, 1,2-bis(trichlorosilyl)ethane, 1,3-bis(trichlorosilyl)propane, 1,4-bis(trichlorosilyl)butane, 1,5-bis(trichlorosilyl)pentane, and 1,6-bis(trichlorosilyl)hexane; alkoxysilane compounds such as hexamethoxydisilane, hexaethoxydisilane, bis(trimethoxysilyl)methane, bis(triethoxysilyl)methane, bis(trimethoxysilyl)ethane, bis(triethoxysilyl)ethane, bis(trimethoxysilyl)propane, bis(triethoxysilyl)propane, bis(trimethoxysilyl)butane, bis(triethoxysilyl)butane, bis(trimethoxysilyl)heptane, bis(triethoxysilyl)heptane, bis(trimethoxysilyl)hexane, bis(triethoxysilyl)hexane, bis(trimethoxysilyl)benzene, bis(triethoxysilyl)benzene, bis(trimethoxysilyl)cyclohexane, bis(triethoxysilyl)cyclohexane, bis(triethoxysilyl)benzene, bis(trimethoxysilyl)octane, bis(triethoxysilyl)octane, bis(trimethoxysilyl)nonane, bis(triethoxysilyl)nonane, bis(trimethoxysilyl)ethylene, bis(triethoxysilyl)ethylene, bis(trimethoxysilylethyl)benzene, bis(triethoxysilylethyl)benzene, bis(3-trimethoxysilylpropyl)ethane, and bis(3-triethoxysilylpropyl)ethane; alkoxysilane compounds containing amino groups, such as bis(3-trimethoxysilylpropyl)methylamine, bis(3-triethoxysilylpropyl)methylamine, bis(3-trimethoxysilylpropyl)ethylamine, bis(3-triethoxysilylpropyl)ethylamine, bis(3-trimethoxysilylpropyl)propylamine, bis(3-triethoxysilylpropyl)propylamine, bis(3-trimethoxysilylpropyl)butylamine, bis(3- triethoxysilylpropyl)butylamine, bis(3-trimethoxysilylpropyl)phenylamine, bis(3-triethoxysilylpropyl)phenylamine, bis(3-trimethoxysilylpropyl)benzylamine, bis(3-triethoxysilylpropyl)benzylamine, bis(trimethoxysilylmethyl)methylamine, bis(triethoxysilylmethyl)methylamine, bis(2-trimethoxysilylethyl)methylamine, bis(2-triethoxysilylethyl)methylamine, bis(triethoxysilylmethyl)propylamine, and bis(2-triethoxysilylethyl)propylamine; alkoxysilane compounds containing amino groups, such as tris(trimethoxysilylmethyl)amine, tris(2-triethoxysilylethyl)amine, tris(3-trimethoxysilylpropyl)amine, and tris(3-triethoxysilylpropyl)amine.

Preferred examples of the polyorganosiloxane compound include compounds represented by the following formulae (I) to (III). That is, the compound having a functional group which is capable of reacting with the active terminals of the active conjugated diene-based polymer chain preferably includes at least one kind selected from these polyorganosiloxane compounds, and it is also acceptable to combine plural kinds. Furthermore, such a polyorganosiloxane compound may also be combined with another compound having a functional group which is capable of reacting with active terminals, for example, a compound represented by the above formula (IV).

Formula (I):
[Chemical Formula 14]

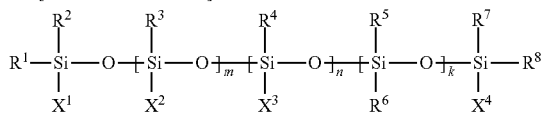

[in the formula (I), $R^1$ to $R^8$ each represent an alkyl group having 1 to 6 carbon atoms or an aryl group having 6 to 12 carbon atoms, while these may be identical to or different from each other; $X^1$ and $X^4$ each represent a group having a functional group which reacts with the active terminals of the active conjugated diene-based polymer chain, or an alkyl group having 1 to 6 carbon atoms or an aryl group having 6 to 12 carbon atoms, while $X^1$ and $X^4$ may be identical to or different from each other; $X^2$ represents a group having a functional group which reacts with the active terminals of the active conjugated diene-based polymer chain; $X^3$ represents a group containing 2 to 20 repeating units of alkylene glycol, or may partly represent a group derived from a group containing 2 to 20 repeating units of alkylene glycol; m represents an integer of 3 to 200; n represents an integer of 0 to 200; and k represents an integer of 0 to 200].

Formula (II):
[Chemical Formula 15]

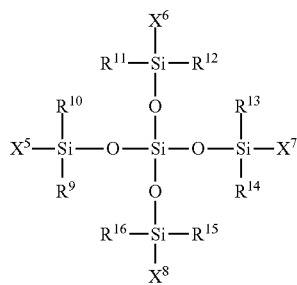

[in the formula (II), $R^9$ to $R^{16}$ each represent an alkyl group having 1 to 6 carbon atoms or an aryl group having 6 to 12 carbon atoms, while these may be identical to or different from each other; and $X^5$ to $X^8$ each represent a group having a functional group which reacts with the active terminals of the active conjugated diene-based polymer chain].

Formula (III):
[Chemical Formula 16]

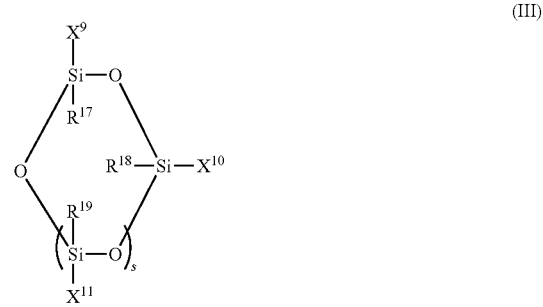

[in the formula (III), $R^{17}$ to $R^{19}$ each represent an alkyl group having 1 to 6 carbon atoms or an aryl group having 6 to 12 carbon atoms, while these may be identical to or different from each other; $X^9$ to $X^{11}$ each represent a group having a functional group which reacts with the active terminals of the active conjugated diene-based polymer chain; and s represents an integer of 1 to 18].

In the polyorganosiloxane represented by the above formula (I), examples of the alkyl group having 1 to 6 carbon atoms that constitutes $R^1$ to $R^8$, $X^1$ and $X^4$ include a methyl group, an ethyl group, an n-propyl group, an isopropyl group, a butyl group, a pentyl group, a hexyl group, and a cyclohexyl group. Examples of the aryl group having 6 to 12 carbon atoms include a phenyl group and a methylphenyl group. Among these alkyl groups and aryl groups, a methyl group is particularly preferred.

In the polyorganosiloxane of the formula (I), the group having a functional group which reacts with the active terminals of the polymer chain, that is, the group constituting $X^1$, $X^2$ and $X^4$, is preferably an alkoxy group having 1 to 5 carbon atoms, or a hydrocarbon group containing a 2-pyrrolidonyl group, or a group having 4 to 12 carbon atoms and containing an epoxy group.

Examples of the alkoxy group having 1 to 5 carbon atoms that constitutes $X^1$, $X^2$ and $X^4$ include a methoxy group, an ethoxy group, a propoxy group, an isopropoxy group, and a butoxy group. Among them, a methoxy group is preferred. When at least one of $X^1$, $X^2$ and $X^4$ is an alkoxy group having 1 to 5 carbon atoms, if a polyorganosiloxane having the alkoxy group is allowed to react with the active terminals of the active conjugated diene-based polymer chain, the bond between a silicon atom and the oxygen atom of the alkoxy group is cleaved, and the active conjugated diene-based polymer chain is directly bonded to the silicon atom, thereby forming a single bond.

The hydrocarbon group containing a 2-pyrrolidonyl group that constitutes $X^1$, $X^2$ and $X^4$ is preferably a group represented by the following formula (V):

[Chemcial Formula 17]

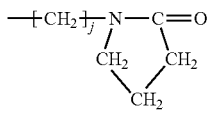

(v)

[in the formula (V), j represents an integer of 2 to 10, and j is particularly preferably 2].

When a polyorganosiloxane in which at least one of $X^1$, $X^2$ and $X^4$ contains a hydrocarbon group containing a 2-pyrrolidonyl group as mentioned above, is allowed to react with the active terminals of the active conjugated diene-based polymer chain, the carbon-oxygen bond of the carbonyl group that constitutes the 2-pyrrolidonyl group is cleaved, and a structure in which the polymer chain is bonded to the carbon atom is formed.

The group having 4 to 12 carbon atoms and having an epoxy group, which constitutes $X^1$, $X^2$ and $X^4$, is preferably a group represented by the following formula (VI).

ZYE          Formula (VI):

In the formula (VI), Z represents an alkylene group or alkylarylene group having 1 to 10 carbon atoms; Y represents a methylene group, a sulfur atom or an oxygen atom; E represents a hydrocarbon group having 2 to 10 carbon atoms and having an epoxy group. Among these, it is preferable that Y be an oxygen atom, and it is more preferable that Y be an oxygen atom and E be a glycidyl group. It is particularly preferable that Z be an alkylene group having 3 carbon atoms, Y be an oxygen atom, and E be a glycidyl group.

In the polyorganosiloxane represented by the formula (I), when at least one of $X^1$, $X^2$ and $X^4$ is a group having 4 to 12 carbon atoms and containing an epoxy group, if the polyorganosiloxane is allowed to react with the active terminals of the active conjugated diene-based polymer chain, the carbon-oxygen bond that constitutes the epoxy ring is cleaved, and a structure in which the polymer chain is bonded to the carbon atom is formed.

In the polyorganosiloxane represented by the formula (I), among the groups described above, $X^1$ and $X^4$ are each preferably a group having 4 to 12 carbon atoms and containing an epoxy group, or an alkyl group having 1 to 6 carbon atoms, and $X^2$ is preferably a group having 4 to 12 carbon atoms and containing an epoxy group.

In the polyorganosiloxane represented by the formula (I), $X^3$ represents a group containing 2 to 20 repeating units of alkylene glycol. The group containing 2 to 20 repeating units of alkylene glycol is preferably a group represented by the following formula (VII).

[Chemical Formula 18]

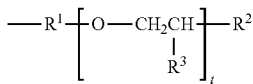

(VII)

In the formula (VII), t represents an integer of 2 to 20; $R^1$ represents an alkylene group or alkylarylene group having 2 to 10 carbon atoms; $R^3$ represents a hydrogen atom or a methyl group; $R^2$ represents an alkoxy group or aryloxy group having 1 to 10 carbon atoms. Among these, it is preferable that t be an integer of 2 to 8, $R^1$ be an alkylene group having 3 carbon atoms, $R^3$ be a hydrogen atom, and $R^2$ be a methoxy group.

In the polyorganosiloxane represented by the formula (II), $R^9$ to $R^{16}$ each represent an alkyl group having 1 to 6 carbon atoms or an aryl group having 6 to 12 carbon atoms, and these may be identical to or different from each other. $X^5$ to $X^8$ each represent a group having a functional group which reacts with the active terminals of the polymer chain.

In the polyorganosiloxane represented by the formula (III), $R^{17}$ to $R^{19}$ each represent an alkyl group having 1 to 6 carbon atoms or an aryl group having 6 to 12 carbon atoms, and these may be identical to or different from each other. $X^9$ to $X^{11}$ each represent a group having a functional group which reacts with the active terminals of the polymer chain. The integer represented by s is 1 to 18.

In the polyorganosiloxanes represented by the formula (II) and the formula (III), the alkyl group having 1 to 6 carbon atoms, the aryl group having 6 to 12 carbon atoms, and the group having a functional group which reacts with the active terminals of the polymer chain are the same as explained for the polyorganosiloxane of the formula (I).

It is preferable, from the viewpoint of having excellent heat generation reduction and wear resistance and providing excellent steering stability, that the compound A include at least one selected from the polyorganosiloxane compounds of formulae (I) to (III).

Furthermore, a terminal modifying group produced by the reaction described above has a functional group which interacts with silica. This functional group which interacts with silica may be a functional group contained in the structure of the compound described above. The functional group may also be a functional group which is produced by a reaction between the compound and an active terminal. The functional group which interacts with silica is not particularly limited, but examples thereof include an alkoxysilyl group, a hydroxyl group (including an organosiloxane structure), an aldehyde group, a carboxyl group, an amino group, an imino group, an epoxy group, an amido group, a thiol group, and an ether group. Among them, from the viewpoint of having excellent heat generation reduction and wear resistance and providing excellent steering stability, a hydroxyl group (including an organosiloxane structure) is preferred. As such, when the terminal modifying group contains a functional group which interacts with silica, the affinity with silica is further increased, and dispersibility can be improved to a large extent.

In the present invention, the concentration of the terminal modifying group in the terminal modifying group-containing conjugated diene-based copolymer is determined by the relationship with the weight average molecular weight (Mw) of the terminal modifying group-containing conjugated diene-based copolymer. The weight average molecular weight of the terminal modifying group-containing conjugated diene-based copolymer is 600,000 to 1,000,000, and preferably 650,000 to 850,000, from the viewpoint of having excellent heat generation reduction and wear resistance performance and providing excellent steering stability. When the weight average molecular weight of the terminal modifying group-containing conjugated diene-based copolymer is less than 600,000, the modifying group concentration at the terminals of the terminal modifying group-containing conjugated diene-based copolymer increases, and the dispersibility of silica as a characteristic of the rubber composition is ameliorated. However, since the molecular weight of the polymer itself is low, there is a possibility that strength and rigidity may not be exhibited, while the latitude of improvement of the viscoelastic characteristics at high temperatures is also decreased. When the weight average molecular weight of the terminal modifying group-containing conjugated diene-based copolymer is larger than 1,000,000, the modifying group concentration at the terminals of the terminal modifying group-containing conjugated diene-based copolymer decreases, the affinity with silica is insufficient, and the dispersibility of silica is deteriorated. Thus, the effect of decreasing the rolling resistance is insufficient. Meanwhile, the weight average molecular weight (Mw) of the terminal modifying group-containing conjugated diene-based copolymer is measured by gel permeation chromatography (GPC) based on standard polystyrene conversion.

The terminal modifying group-containing conjugated diene-based copolymer used in the present invention is such that, from the viewpoint of having excellent heat generation reduction and wear resistance performance and providing excellent steering stability, the aromatic vinyl unit content is 38 wt % to 48 wt %, and preferably 40 wt % to 45 wt %. When the aromatic vinyl unit content of the terminal modifying group-containing conjugated diene-based copolymer is in such a range, the rigidity and strength of the rubber composition are increased, and the steering stability can be further increased when the rubber composition is used in pneumatic tires. Furthermore, when a diene-based rubber other than the terminal modifying group-containing conjugated diene-based copolymer is incorporated, the terminal modifying group-containing conjugated diene-based copolymer forms a finely phase-separated form with respect to the other diene-based rubber. For this reason, the terminal modifying group-containing conjugated diene-based copolymer is localized in the vicinity of silica particles, and as the terminal modifying groups efficiently act on silica, the affinity with silica is further increased, while the dispersibility of silica is improved. When the aromatic vinyl unit content of the terminal modifying group-containing conjugated diene-based copolymer is less than 38 wt %, the effect of forming a finely phase-separated form with respect to the other diene-based rubber may not be sufficiently obtained. The effect of increasing the rigidity and strength of the rubber composition may not be sufficiently obtained either. When the aromatic vinyl unit content of the terminal modifying group-containing conjugated diene-based copolymer is greater than 48 wt %, the glass transition temperature (Tg) of the conjugated diene-based polymer rubber increases, the balance of viscoelastic characteristics is deteriorated, and it is difficult to obtain an effect of decreasing heat generation. The aromatic vinyl unit content of the terminal modifying group-containing conjugated diene-based copolymer is measured by infrared spectrophotometric analysis (Hampton method).

In the present invention, the vinyl unit content in all the conjugated diene-based monomers that constitute the terminal modifying group-containing conjugated diene-based copolymer is 20 mol % to 35 mol %, and preferably 26 mol % to 34 mol %, from the viewpoint of having excellent heat generation reduction and wear resistance performance and providing excellent steering stability. When the vinyl unit content of the terminal modifying group-containing conjugated diene-based copolymer is adjusted to 20 mol % to 35 mol %, the glass transition temperature (Tg) of the terminal modifying group-containing conjugated diene-based copolymer can be optimized. Also, the finely phase-separated form of the terminal modifying group-containing conjugated diene-based copolymer formed with respect to the other diene-based rubber can be stabilized. When the vinyl unit content of the terminal modifying group-containing conjugated diene-based copolymer is less than 20 mol %, the Tg of the terminal modifying group-containing conjugated diene-based copolymer decreases, and the loss tangent (tan δ) of the dynamic viscoelastic characteristics at 0° C., which is an index of the grip at wet roads, is decreased. Also, the finely phase-separated form of the terminal modifying group-containing conjugated diene-based copolymer cannot be stabilized. When the vinyl unit content of the terminal modifying group-containing conjugated diene-based copolymer is greater than 35 mol %, there is a possibility that the vulcanization rate may decrease, or the strength or rigidity may decrease. The vinyl unit content of the terminal modifying group-containing conjugated diene-based copolymer is measured by infrared spectrophotometric analysis (Hampton method).

The terminal modifying group-containing conjugated diene-based copolymer can improve the molding processability of the rubber composition through oil extension. The amount of oil extension is not particularly limited, but the amount of oil extension is preferably 25 parts by weight or less relative to 100 parts by weight of the terminal modifying group-containing conjugated diene-based copolymer. If the amount of oil extension of the terminal modifying group-containing conjugated diene-based copolymer is greater than 25 parts by weight, the degree of freedom for the composition design at the time of incorporating an oil, a softening agent, a tackifier and the like into the rubber composition is decreased.

Furthermore, the glass transition temperature (Tg) of the terminal modifying group-containing conjugated diene-based copolymer is not particularly limited, but is preferably adjusted to −30° C. to −15° C. When the Tg of the terminal modifying group-containing conjugated diene-based copolymer is in the range described above, steering stability can be secured, and also, rolling resistance can be decreased. The glass transition temperature (Tg) of the terminal modifying group-containing conjugated diene-based copolymer is determined by measuring a thermogram by differential scanning calorimetry (DSC) under the conditions of a rate of temperature increase of 20° C./min, and taking the temperature at the middle of the transition range. When the terminal modifying group-containing conjugated diene-based copolymer is an oil-extended product, the glass transition temperature of the terminal modifying group-containing conjugated diene-based copolymer in the state that the copolymer does not contain oil extension components (oil) will be taken.

According to the present invention, the content of the terminal modifying group-containing conjugated diene-based copolymer is 30 wt % or more, preferably 40 wt % to 90 wt %, and more preferably 50 wt % to 90 wt %, relative to 100 wt % of the diene-based rubber from the viewpoint of having excellent heat generation reduction and wear resistance performance and providing excellent steering stability. When the content of the terminal modifying group-containing conjugated diene-based copolymer is less than 30 wt % of the diene-based rubber, the affinity with silica is decreased, and therefore, the dispersibility of silica cannot be improved.

It is preferable that the terminal modifying group-containing conjugated diene-based copolymer have, as a functional group which interacts with silica, a hydroxyl group and at least one selected from the group consisting of an alkoxysilyl group, an aldehyde group, a carboxyl group, an amino group, an imino group, an epoxy group, an amido group, a thiol group, and an ether group, from the viewpoint of having excellent heat generation reduction and wear resistance performance and providing excellent steering stability.

According to the present invention, the diene-based rubber can include a diene-based rubber other than the terminal modifying group-containing conjugated diene-based copolymer as a rubber component.

The diene-based rubber other than the terminal modifying group-containing conjugated diene-based copolymer is not particularly limited as long as it is a rubber obtained by homopolymerizing a conjugated diene-based monomer or if necessary, copolymerizing a conjugated diene-based monomer with an aromatic vinyl monomer. The same conjugated diene-based monomer and aromatic vinyl monomer as those described above may be used.

The aromatic vinyl monomer content in the diene-based rubber other than the terminal modifying group-containing conjugated diene-based copolymer is preferably 38 wt % to 48 wt %, from the viewpoint of having excellent reinforcing properties.

The vinyl unit content in all the conjugated diene-based monomers constituting the diene-based rubber other than the terminal modifying group-containing conjugated diene-based copolymer is preferably 25 wt % to 50 wt %, and can be adjusted to be greater than 35 wt % but not greater than 50 wt %.

The weight average molecular weight of the diene-based rubber other than the terminal modifying group-containing conjugated diene-based copolymer is preferably 450,000 to 1,300,000, from the viewpoint of having excellent wear resistance and strength.

The diene-based rubber other than the terminal modifying group-containing conjugated diene-based copolymer may have a terminal modifying group. The terminal modifying group (functional group which interacts with silica) may be, for example, at least one selected from the group consisting of an alkoxysilyl group, a hydroxyl group, an aldehyde group, a carboxyl group, an amino group, an imino group, an epoxy group, an amido group, a thiol group, and an ether group.

Examples of the other diene-based rubber (or the main chain of the other diene-based rubber) include a natural rubber, an isoprene rubber, a butadiene rubber, a solution polymerized styrene-butadiene rubber (S-SBR), an emulsion polymerized styrene-butadiene rubber (E-SBR), a butyl rubber, and a halogenated butyl rubber. Preferred are a natural rubber, a butadiene rubber, an emulsion polymerized styrene-butadiene rubber, and a solution polymerized styrene-butadiene rubber. Furthermore, a modified diene-based rubber other than the terminal modifying group-containing conjugated diene-based copolymer described above can be incorporated as the other diene-based rubber.

The other diene-based rubber is not particularly limited in terms of the production. For example, the conventionally known production methods of diene-based rubber may be used.

The other diene-based rubber can be used alone or as a blend of plural kinds. In regard to the content of the other diene-based rubber, from the viewpoint of having excellent steering stability, grip properties and cost savings, it is preferable that the diene-based rubber include a diene-based rubber other than the terminal modifying group-containing conjugated diene-based copolymer in an amount of 0 wt % to 70 wt %, and more preferably in an amount of 60 wt % or less, of the total amount of the diene-based rubber.

The silica will be described below. The silica that is contained in the rubber composition for tire tread of the present invention is not particularly limited. Regarding the silica, a silica used in a conventional rubber composition for tire tread, for example, a wet processed silica, a dry processed silica, or a surface treated silica can be used. The particle properties of the silica are not particularly limited. From the viewpoint of having excellent heat generation reduction and wear resistance performance and providing excellent steering stability and durability performance, a silica which satisfies the four particle properties of the following items (1) to (4) can be used.

(1) DBP absorption number of 190 ml/100 g or greater.

The DBP absorption number of the silica can be adjusted to 190 ml/100 g or greater. When the DBP absorption number is 190 ml/100 g or greater, the breaking strength is excellent. The DBP absorption number of the silica is determined according to the oil absorption number determination method A of JIS K6217-4.

(2) Nitrogen adsorption specific surface area ($N_2SA$) of 150 $m^2/g$ to 225 $m^2/g$.

The nitrogen adsorption specific surface area ($N_2SA$) of the silica can be adjusted to 150 $m^2/g$ to 225 $m^2/g$, and is preferably 194 $m^2/g$ to 225 $m^2/g$. When the $N_2SA$ of the silica is 225 $m^2/g$ or less, the silica has excellent miscibility and can be kneaded uniformly. Thus, a stable rubber material can be obtained. The N2SA of the silica is determined according to JIS K6217-2.

(3) CTAB specific surface area (CTAB) of 150 $m^2/g$ to 215 $m^2/g$.

The CTAB specific surface area (CTAB) of the silica can be adjusted to 150 $m^2/g$ to 215 $m^2/g$, and is preferably 185 $m^2/g$ to 215 $m^2/g$. When the CTAB of the silica is 215 $m^2/g$ or less, the rolling resistance is excellent. The CTAB of the silica is determined according to JIS K6217-3.

(4) Ratio of $N_2SA$ to CTAB ($N_2SA$/CTAB) of 0.9 to 1.4.

The ratio between $N_2SA$ and CTAB described above ($N_2SA$/CTAB) is preferably adjusted to 0.9 to 1.4. When the characteristic ratio ($N_2SA$/CTAB) of the silica is 0.9 or greater, the reinforcing properties are excellent. When the characteristic ratio ($N_2SA$/CTAB) of the silica is 1.4 or less, the dispersibility of the silica is excellent, and rolling resistance is excellent.

A silica with a high specific surface area which satisfies all of the particle properties of the items (1) to (4) and has the conditions of (2) and (3) in preferred ranges (for example, Zeosil Premium 200 MP manufactured by Rhodia S.A.) exhibits a strong interaction between the particle surfaces and lacks affinity with diene-based rubbers. Therefore, when the silica is simply incorporated into a diene-based rubber, it is difficult to make the dispersibility satisfactory, and an effect of modifying the dynamic viscoelastic characteristics such as tan δ cannot be sufficiently obtained. Furthermore, even if the silica is incorporated together with a conventional terminal-modified styrene-butadiene rubber, it cannot be said that the dispersibility of the silica with a high specific surface area is necessarily sufficiently improved.

In contrast, in the present invention, when a silica with a high specific surface area which satisfies all of the particle properties of the items (1) to (4) and has the conditions of (2) and (3) in preferred ranges, is incorporated together with the terminal modifying group-containing conjugated diene-based copolymer described above, the dispersibility of the silica can be improved. Accordingly, the terminal modifying group-containing conjugated diene-based copolymer and the silica with a high specific surface area both modify the tan δ, and a further synergistic effect can be obtained.

Meanwhile, in the present invention, the silica used is not particularly limited as described above, and a silica other than the silica with a high specific surface area can be used.

The silica can be appropriately selected for use from the products that are commercially available. Furthermore, a silica obtainable by a conventional production method can be used. One kind of silica can be used alone, or two or more kinds thereof can be used in combination.

The amount of the silica is preferably 20 parts to 120 parts by weight, and more preferably 30 parts to 90 parts by weight, relative to 100 parts by weight of the diene-based rubber, from the viewpoint of having excellent heat generation reduction and wear resistance performance, and providing excellent steering stability and durability performance.

The carbon black will be described below. The carbon black that is contained in the rubber composition for tire tread of the present invention is not particularly limited. For example, the conventionally known products may be used. One kind of carbon black can be used alone, or two or more kinds thereof can be used in combination.

The amount of the carbon black is preferably 0 parts to 40 parts by weight, and more preferably 5 parts to 35 parts by weight, relative to 100 parts by weight of the diene-based rubber, from the viewpoint of having excellent wear resistance performance and providing excellent steering stability.

According to the present invention, the total amount of the silica and the carbon black is 35 parts to 140 parts by weight relative to 100 parts by weight of the diene-based rubber, from the viewpoint of having excellent heat generation reduction and wear resistance performance and providing excellent steering stability and durability performance. The total amount of the silica and the carbon black is preferably 35 parts to 120 parts by weight, and more preferably 40 parts to 100 parts by weight, relative to 100 parts by weight of the diene-based rubber, for the same reason.

The silane coupling agent will be described below. The silane coupling agent that is contained in the rubber composition for tire tread of the present invention is at least one of silane coupling agents represented by the following formulae (a) to (c).

[Chemical Formula 19]

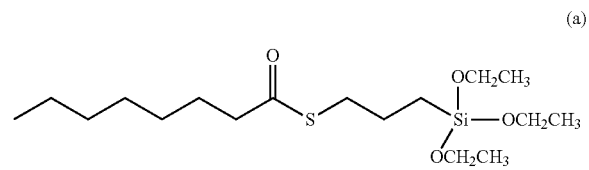
(a)

[Chemical Formula 20]

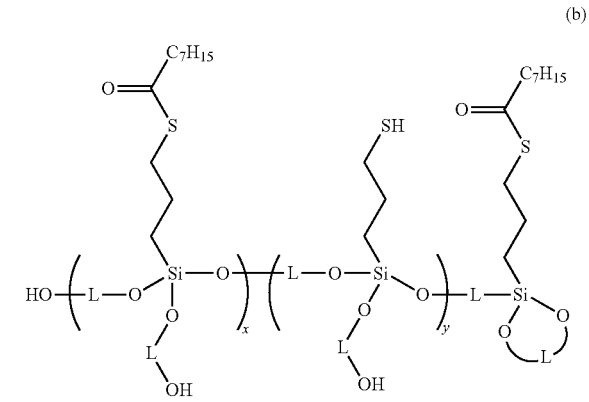
(b)

[In the formula (b), each L independently represents an alkanediyl group or alkenediyl group having 1 to 9 carbon atoms; x represents an integer of 1 to 150; and y represents an integer of 1 to 150].

In the formula (b), each L independently represents an alkanediyl group or alkenediyl group having 1 to 9 carbon atoms; x represents an integer of 1 to 150; and y represents an integer of 1 to 150.

The alkanediyl group having 1 to 9 carbon atoms may be a divalent alkane, and may be either linear or branched. Examples of the alkanediyl group having 1 to 9 carbon atoms include a methylene group, an ethylene group, a trimethylene group, and a propylene group.

The alkenediyl group may be a divalent alkene, and may be either linear or branched. The number of carbon atoms of the alkenediyl group can be set to 2 to 9. Examples of the alkenediyl group include a vinylene group and a propenylene group.

The integer represented by x is 1 to 150, with an integer of 1 to 150 being preferred.

The integer represented by y is 1 to 150, with an integer of 1 to 125 being preferred.

[Chemical Formula 21]

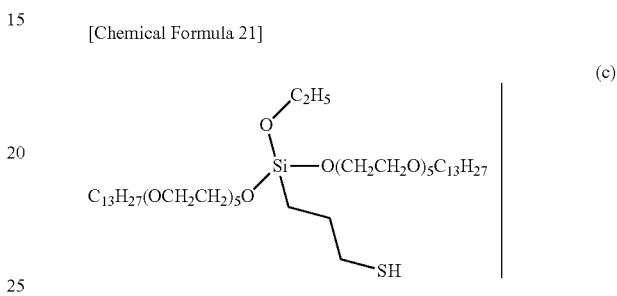
(c)

When the rubber composition for tire tread of the present invention contains the silane coupling agent described above, the rubber composition is excellent in heat generation reduction and wear resistance, and provides excellent steering stability. Also, for the same reasons, silane coupling agents represented by the formula (b) and formula (c) are preferred.

Each silane coupling agent can be used alone, or two or more kinds thereof can be used in combination. The silane coupling agent is not particularly limited in terms of the production. For example, conventionally known production methods of silane coupling agent may be used.

According to the present invention, the amount of the silane coupling agent is 4 wt % to 18 wt % on the amount of the silica, from the viewpoint of having excellent heat generation reduction and wear resistance, and providing excellent steering stability. The amount of the silane coupling agent is more preferably 5 wt % to 16 wt % on the amount of the silica, for the same reason.

The rubber composition for tire tread of the present invention can further contain a filler other than the silica and the carbon black. Examples of the filler other than the silica and the carbon black include clay, mica, talc, calcium carbonate, aluminum hydroxide, aluminum oxide, and titanium oxide. The content of the other filler may be adjusted to 50 wt % or less, preferably 0 wt % to 30 wt %, relative to 100 wt % of the total content of the fillers. When the content of the other filler is greater than 50 wt %, rolling resistance is deteriorated.

The rubber composition for tire tread of the present invention can further contain additives as necessary, as long as the effect or purpose of the inventive composition is not impaired. Examples of the additives include various compounding agents that are generally used in rubber compositions for tire tread, such as a vulcanizing agent or a crosslinking agent, a vulcanization accelerating agent, an antioxidant, a plasticizer, a processing aid, a liquid polymer, a terpene resin, and a thermosetting resin. The additives may be kneaded into a rubber composition by a general method, and can be used for vulcanization or crosslinking. The blending amounts of the additives may be adjusted to the conventional general blending amounts, as long as the purpose of the invention is achieved.

The rubber composition for tire tread of the present invention can be prepared by mixing the various components described above, by using a known rubber kneading machine, for example, a Banbury mixer, a kneader, or a roller.

The rubber composition for tire tread of the present invention can be suitably used for pneumatic tires (for example, tire treads). A pneumatic tire which uses this rubber composition in the tread part can exhibit reduction in heat generation (reduction in rolling resistance), wear resistance performance and steering stability that have been improved to a level superior to a conventional level.

The pneumatic tire of the present invention will be described below. The pneumatic tire of the present invention is a pneumatic tire which uses the rubber composition for tire tread of the present invention.

The pneumatic tire of the present invention will be described below with reference to the attached drawing.

FIG. 1 shows an exemplary embodiment of a pneumatic tire which uses the rubber composition for tire tread. In FIG. 1, reference numeral 1 represents a tread section, 2 represents a side wall section, and 3 represents a bead section.

In FIG. 1, two carcass layers 4 in each of which reinforcing codes extending in the tire diameter direction are arranged in the circumferential direction of the tire at predetermined intervals and embedded in a rubber layer, run between the bead section 3 on the right side and the bead section 3 on the left side. Each carcass layer is folded back at both its end portions around bead cores 5 embedded in the bead sections 3 from the inner side in the tire axis direction to the outer side, such that the end portions enclose corresponding bead fillers 6. An inner liner layer 7 is disposed on the inner side of the carcass layers 4. On the outer peripheral side of the carcass layers 4 in the tread section 1, two belt layers 8 are disposed, in each of which reinforcing codes extending obliquely to the tire circumferential direction are arranged in the tire axis direction at predetermined intervals and embedded in the rubber layer. The reinforcing codes of these two belt layers 8 are intersecting between the layers, such that the oblique directions to the tire circumferential direction are reverse to each other. On the outer peripheral side of the belt layers 8, belt cover layers 9 are disposed. The tread section 1 is formed by a tread rubber layer 12 on the outer peripheral side of the belt cover layers 9. The tread rubber layer 12 is composed of the rubber composition for tire tread of the present invention. A side rubber layer 13 is disposed on the outer side of the carcass layer 4 in each side wall section 2, and a rim cushion rubber layer 14 is provided on the outer side of the back-folded area of the carcass layer 4 in each bead section 3.

The pneumatic tire of the present invention is not particularly limited as long as the rubber composition for tire tread of the present invention is used in the pneumatic tire, and the pneumatic tire can be produced by, for example, any conventionally known method. Furthermore, regarding the gas that is filled in the tire, normal air or air with adjusted oxygen partial pressure, or an inert gas such as nitrogen, argon or helium can be used.

EXAMPLES

Hereinafter, the present invention will be specifically described in the Examples. However, the present invention is not intended to be limited to these.

<Preparation of Rubber Composition for Tire Tread>

The components indicated in Table 1 were used in the amounts (parts by weight) indicated in the same table (provided that sulfur and a vulcanization accelerating agent are excluded), and these components were kneaded with a 16-L closed type mixer at 150° C. for 6 minutes to obtain a master batch. Sulfur and a vulcanization accelerating agent were added to the master batch, and the mixture was kneaded with an open roller to prepare a rubber composition.

<Preparation of Vulcanized Rubber Sample>

The rubber composition for tire tread obtained as described above was press vulcanized in a mold having a predetermined shape at 160° C. for 20 minutes, and thus a vulcanized rubber sample was prepared.

<Production of Pneumatic Tire>

By using the rubber composition for tire tread described above in the tread section, four pneumatic tires having a tire structure shown in the attached FIG. 1 and a tire size of 225/50 R17 were produced from each rubber composition for tire.

<Evaluation>

A vulcanized rubber sample obtained as described above was used, and the rolling performance (tan δ at 60° C.) and the wear resistance performance were measured by the methods that will be described below. The pneumatic tires obtained as described above were used, and the steering stability was measured by the method described below. The results are shown in Table 1.

Rolling Performance

The rolling performance of the vulcanized rubber samples obtained as described above was evaluated by means of tan δ. The tan δ was measured by using a viscoelastic spectrometer manufactured by Toyo Seiki Co., Ltd., under the conditions of an initial strain of 10%, an amplitude of ±2%, a frequency of 20 Hz, and a temperature of 60° C. The results thus obtained are expressed as an index determined by designating Comparative Example 1 as 100. As this index is larger, the tan δ value is smaller, and the composition is less heat-generating. This means that when the rubber sample in question is produced into a pneumatic tire, the rolling resistance is smaller, and the rolling performance and the fuel efficiency are more excellent.

Steering Stability

The pneumatic tires obtained as described above were mounted in a 2.5-liter class test vehicle made in Japan by assembling the tires to wheels having a rim size of 7×J, and the vehicle was driven in a test course of 2.6 km per circuit with a dry road surface under the conditions of a pneumatic pressure of 230 kPa. The steering stability at the time of test driving was scored by a sensory evaluation by three experts. The results thus obtained are expressed as an index determined by designating Comparative Example 1 as 100. A larger value of this index means that the steering stability at a dry road surface is superior.

Wear Resistance Performance

The wear amount of the vulcanized rubber sample obtained as described above was measured by using a Lambourne abrasion testing machine (manufactured by Iwamoto Seisakusho Co., Ltd.) according to JIS K6264, under the conditions of a load of 49 N, a slippage ratio of 25%, a time period of 4 minutes, and at room temperature. The results thus obtained are expressed as an index determined by designating the reciprocal of the wear amount of Comparative Example 1 as 100. A larger value of this index means superior wear resistance.

TABLE 1

| | Comparative Example | | | | Reference Example | Comparative Example | Example | | | Comparative Example | Example | | | |
|---|---|---|---|---|---|---|---|---|---|---|---|---|---|---|
| | 1 | 2 | 3 | 4 | 1 | 5 | 1 | 2 | 3 | 6 | 4 | 5 | 6 | 7 |
| SBR1 | 68.75 | 68.75 | 68.75 | 68.75 | | | | | | | | | | |
| SBR2 | 68.75 | 68.75 | 68.75 | 68.75 | 68.75 | 123.75 | 68.75 | 68.75 | 68.75 | 68.75 | | | | |
| SBR3 | | | | | 60 | 12 | 60 | 60 | 60 | 60 | 120 | 120 | 120 | 120 |
| Oil | 3 | 3 | 3 | 3 | 11.75 | 4.75 | 11.75 | 11.75 | 11.75 | 11.75 | 20.5 | 20.5 | 20.5 | 20.5 |
| CB | 15 | 15 | 15 | 15 | 15 | 15 | 15 | 15 | 15 | 15 | 15 | 15 | 15 | 15 |
| Silica 1 | 80 | 80 | 80 | 80 | 80 | 80 | 80 | 80 | 80 | 80 | | | | |
| Silica 2 | | | | | | | | | | | 80 | 80 | 80 | 100 |
| Silane coupling agent 1 (SI75) | 6.4 | | | | 6.4 | | | | | | | | | |
| Silane coupling agent 2 (NXT) | | 6.4 | | | | 6.4 | 6.4 | | | 2.4 | 8 | | | |
| Silane coupling agent 3 (NXT-Z45) | | | 6.4 | | | | | 6.4 | | | | 9.6 | | |
| Silane coupling agent 4 (SI363) | | | | 6.4 | | | | | 6.4 | | | | 9.6 | 12 |
| 6C | 2 | 2 | 2 | 2 | 2 | 2 | 2 | 2 | 2 | 2 | 2 | 2 | 2 | 2 |
| WAX | 1 | 1 | 1 | 1 | 1 | 1 | 1 | 1 | 1 | 1 | 1 | 1 | 1 | 1 |
| Zinc white | 3 | 3 | 3 | 3 | 3 | 3 | 3 | 3 | 3 | 3 | 3 | 3 | 3 | 3 |
| Vulcanization accelerating agent 1 | 2 | 2 | 2 | 2 | 2 | 2 | 2 | 2 | 2 | 2 | 2 | 2 | 2 | 2 |
| Vulcanization accelerating agent 2 | | | 0.15 | 0.15 | | | | 0.15 | 0.15 | | | 0.15 | 0.15 | 0.1 |
| Vulcanization accelerating agent 3 | 2 | 2 | | | 2 | 2 | 2 | | | 2 | 2 | | | |
| Sulfur | 1.5 | 1.5 | 1.5 | 1.5 | 1.5 | 1.5 | 1.5 | 1.5 | 1.5 | 1.5 | 1.5 | 1.5 | 1.5 | 1.5 |
| Rolling performance (heat generation reduction) (index) | 100 | 105 | 115 | 120 | 105 | 102 | 110 | 130 | 145 | 90 | 106 | 125 | 133 | 106 |
| Steering stability (index) | 100 | 100 | 95 | 90 | 105 | 100 | 110 | 115 | 105 | 100 | 110 | 115 | 110 | 140 |
| Wear resistance performance (index) | 100 | 90 | 105 | 100 | 105 | 90 | 105 | 120 | 110 | 90 | 108 | 128 | 115 | 120 |

The details of the respective components shown in Table 1 are as follows.

SBR1: An emulsion polymerized styrene butadiene rubber having an aromatic vinyl unit content of 40 wt %, a vinyl unit content of 13.5 mol % and a weight average molecular weight (Mw) of 760,000, a Tg of −28° C.; trade name: Nipol 1739 manufactured by Zeon Corp., Japan; an oil-extended product containing 37.5 parts by weight of an oil component relative to 100 parts by weight of the rubber component; no terminal modification.

SBR2: A terminally modified, solution polymerized styrene-butadiene rubber having an aromatic vinyl unit content of 39 wt %, a vinyl unit content of 45 mol %, a weight average molecular weight (Mw) of 800,000 and a Tg of −26° C.; Tufdene E580 manufactured by Asahi Kasei Chemicals Corp.; an oil-extended product containing 37.5 parts by weight of an oil component relative to 100 parts by weight of the rubber component.

SBR3: A terminal modifying group-containing conjugated diene-based copolymer having an aromatic vinyl unit content of 42 wt %, a vinyl unit content of 32 wt %, a weight average molecular weight (Mw) of 750,000 and a Tg of −25° C.; an oil-extended product containing 25 parts by weight of an oil component relative to 100 parts by weight of the rubber component; a terminally modified, solution polymerized styrene-butadiene rubber prepared by the following production method.

[Production Method for SBR3]

In a nitrogen-purged autoclave reactor having an inner capacity of 10 L, 4533 g of cyclohexane, 338.9 g (3.254 mol) of styrene, 468.0 g (8.652 mol) of butadiene, 20.0 g (0.294 mol) of isoprene, and 0.189 mL (1.271 mmol) of N,N,N',N'-tetramethylethylenediamine were introduced, and stirring was started. The temperature of the content in the reaction vessel was adjusted to 50° C., and then 5.061 mL (7.945 mmol) of n-butyllithium was added thereto. After the polymerization conversion ratio almost reached 100%, 12.0 g of isoprene was further added thereto, and the mixture was allowed to react for 5 minutes. Subsequently, 0.281 g (0.318 mmol) of a 40 wt % toluene solution of 1,6-bis (trichlorosilyl)hexane was added to the mixture, and the resultant was allowed to react for 30 minutes. Furthermore, 18.3 g (0.318 mmol) of a 40 wt % xylene solution of Polyorganosiloxane A shown below was added to the reaction mixture, and the mixture was allowed to react for 30 minutes. 0.5 mL of methanol was added thereto, and the mixture was stirred for 30 minutes. A smaller amount of an antioxidant (Irganox 1520, manufactured by BASF Corp.) was added to the polymer solution thus obtained, and 25 parts of Fukkol Eramic 30 (manufactured by Shin Nippon Oil Corp.) was added thereto as an extending oil. Subsequently, rubber in a solid state was collected by a steam stripping method. The solid rubber thus obtained was dehydrated with a roller, and was dried in a dryer. Thus, a modified S-SBR1 was obtained. The modified S-SBR1 was designated as SBR3. The SBR3 contains 20 parts by weight of an oil component relative to 100 parts by weight of the rubber component.

Polyorganosiloxane A: A polyorganosiloxane having a structure of the formula (I), in which m=80, n=0, k=120, $X^1$, $X^4$, $R^1$ to $R^3$ and $R^5$ to $R^8$ each represent a methyl group (—CH$_3$), and $X^2$ represents a hydrocarbon group represented by the following formula.

[Chemical Formula 22]

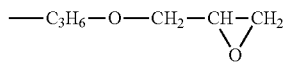

Oil: Aroma oil, Extract No. 4S manufactured by Showa Shell Sekiyu K.K.
CB: Carbon black, Seast KH manufactured by Tokai Carbon Co., Ltd.
Silica 1: Zeosil 1165 MP manufactured by Rhodia S.A. having a DBP absorption number of 200 ml/100 g, a nitrogen adsorption specific surface area (N$_2$SA) of 160 m$^2$/g, a CTAB specific surface area (CTAB) of 159 m$^2$/g, and a ratio of N$_2$SA to CTAB (N$_2$SA/CTAB) of 1.01.
Silica 2: Zeosil Premium 200 MP manufactured by Rhodia S.A. having a DBP absorption number of 203 ml/100 g, a nitrogen adsorption specific surface area (N$_2$SA) of 200 m$^2$/g, a CTAB specific surface area (CTAB) of 197 m$^2$/g, and a ratio of N$_2$SA to CTAB (N$_2$SA/CTAB) of 1.02.
Silane coupling agent 1 (SI75): Si75 manufactured by Evonik Degussa GmbH.
Silane coupling agent 2 (NXT): NXT silane manufactured by Momentive Performance Materials, Inc.
Silane coupling agent 3 (NXT-Z45): NXT-Z45 manufactured by Momentive Performance Materials, Inc.; obtainable according to the synthesis method described in US Patent Application No. 2007/0197725 A, with its ratio of the unit containing a thioester to the unit containing a mercapto group being 55:45; x:y=55:45 (mol %) in the formula (b).
Silane coupling agent 4 (SI363): Si363 manufactured by Evonik Degussa GmbH; a compound represented by the following formula.

[Chemical Formula 23]

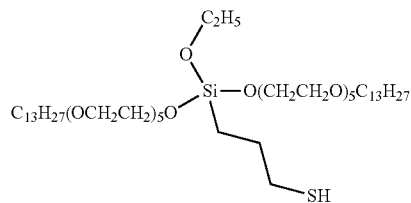

6C: SANTOFLEX 6PPD manufactured by Flexsys, Inc.
WAX: Wax Sunnoc manufactured by Ouchi Shinko Chemical Industrial Co., Ltd.
Zinc white: Third grade zinc oxide manufactured by Seido Chemical Industry Co., Ltd.
Vulcanization accelerating agent 1: Vulcanization accelerator CBS; Noxeler CZ-G manufactured by Ouchi Shinko Chemical Industrial Co., Ltd.
Vulcanization accelerating agent 2: Vulcanization accelerator TBzTD; PERKACIT TBzTD (tetrabenzyl thiuram disulfide) manufactured by Flexsys, Inc.
Vulcanization accelerating agent 3: Vulcanization accelerator DPG; Soxinol D-G manufactured by Sumitomo Chemical Co., Ltd.
Sulfur: "GOLDEN FLOWER" oil-treated sulfur powder manufactured by Tsurumi Chemical Industry Co., Ltd.

As is obvious from the results shown in Table 1, Comparative Example 2 which contains an SBR other than the terminal modifying group-containing conjugated diene-based copolymer that is contained in the present invention, had poor wear resistance performance and did not exhibit any improvement in the steering stability, as compared to Comparative Example 1 (containing an SBR other than the terminal modifying group-containing conjugated diene-based copolymer contained in the present invention, and a silane coupling agent other than the silane coupling agent contained in the present invention). Comparative Example 3 containing an SBR other than the terminal modifying group-containing conjugated diene-based copolymer that is contained in the present invention provided poorer steering stability compared to Comparative Example 1. Comparative Example 4 containing an SBR other than the terminal modifying group-containing conjugated diene-based copolymer that is contained in the present invention provided poorer steering stability compared to Comparative Example 1, and did not exhibit any improvement in the wear resistance performance. Comparative Example 5 in which the amount of the terminal modifying group-containing conjugated diene-based copolymer that is included in the diene-based rubber was less than 30 wt %, had poorer wear resistance performance compared to Comparative Example 1, and did not exhibit any improvement in the steering stability. Comparative Example 6 in which the amount of the silane coupling agent was less than 4 wt % on the amount of silica, had poorer heat generation reduction (rolling performance) and poorer wear resistance performance.

In contrast to these, Examples 1 to 7 were excellent in the heat generation reduction (rolling performance), wear resistance performance and steering stability. From these results, it was clear that the present invention improved steering stability through a combination of a terminal modifying group-containing conjugated diene-based copolymer and a specific silane coupling agent. Furthermore, in the present invention, the level of performance enhancement in terms of heat generation reduction (rolling performance), wear resistance performance and steering stability was large, and in relation to these effects, it was found that a combination of a terminal modifying group-containing conjugated diene-based copolymer and a specific silane coupling agent had a synergistic effect.

What is claimed is:

1. A rubber composition for tire tread, comprising a diene-based rubber including 30 wt % or more of a terminal modifying group-containing conjugated diene-based copolymer having modified terminals, silica, carbon black, and at least one of silane coupling agents represented by formulae (a) to (c):

[Chemical Formula 1]

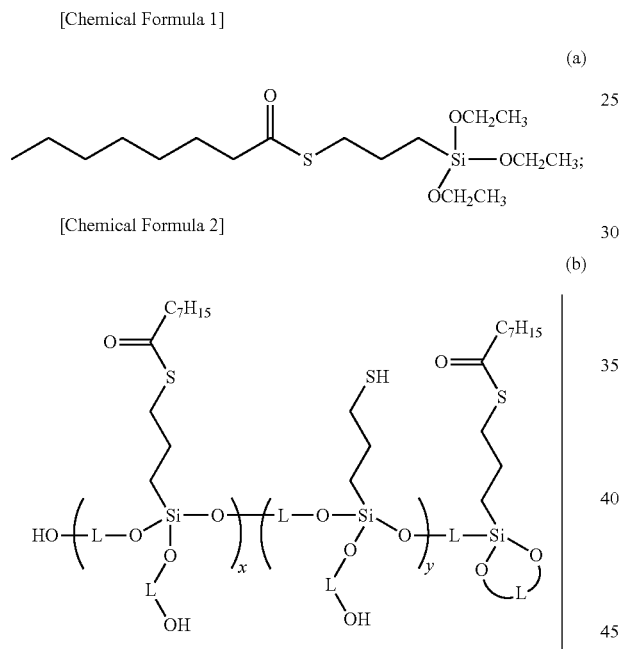

in the formula (b), each L independently represents an alkanediyl group or alkenediyl group having 1 to 9 carbon atoms; x represents an integer of 1 to 150; and y represents an integer of 1 to 150; and

[Chemical Formula 3]

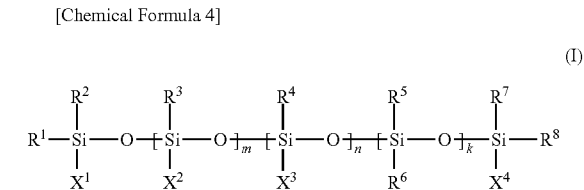

a total amount of the silica and the carbon black being 35 parts to 140 parts by weight relative to 100 parts by weight of the diene-based rubber, an amount of the silane coupling agent or agents being 4 wt % to 18 wt % on an amount of the silica, the terminal modifying group-containing conjugated diene-based copolymer being produced by allowing an active conjugated diene-based polymer chain that is obtained by copolymerizing a conjugated diene-based monomer and an aromatic vinyl monomer by solution polymerization in a hydrocarbon solvent and by using an active organometallic compound as an initiator, to react with at least one kind of a compound A having a functional group which is capable of reacting with an active terminal of the active conjugated diene-based polymer chain, an aromatic vinyl monomer content in the terminal modifying group-containing conjugated diene-based copolymer being 38 wt % to 48 wt %, a vinyl unit content in all conjugated diene-based monomers constituting the terminal modifying group-containing conjugated diene-based copolymer being 20 mol % to 35 mol %, the terminal modifying group-containing conjugated diene-based copolymer having a weight average molecular weight of 650,000 to 850,000, a terminal modifying group carried by the terminal modifying group-containing conjugated diene-based copolymer containing a functional group which interacts with the silica, the silica having a DBP absorption number of at least 190 ml/100 g, a nitrogen adsorption specific surface area ($N_2SA$) of 194 $m^2/g$ to 225 $m^2/g$, a CTAB specific surface area (CTAB) of 185 $m^2/g$ to 215 $m^2/g$ and a ratio of the $N_2SA$ to the CTAB ($N_2SA/CTAB$) of 0.9 to 1.4, and the amount of silica being 20 parts to 120 parts by weight relative to 100 parts by weight of the diene-based rubber.

2. The rubber composition for tire tread according to claim 1, wherein the compound A includes at least one selected from polyorganosiloxane compounds represented by formulae (I) to (III):

[Chemical Formula 4]

$$R^1-\underset{\underset{X^1}{|}}{\overset{\overset{R^2}{|}}{Si}}-O + \underset{\underset{X^2}{|}}{\overset{\overset{R^3}{|}}{Si}}-O +_m \underset{\underset{X^3}{|}}{\overset{\overset{R^4}{|}}{Si}}-O +_n \underset{\underset{R^6}{|}}{\overset{\overset{R^5}{|}}{Si}}-O +_k \underset{\underset{X^4}{|}}{\overset{\overset{R^7}{|}}{Si}}-R^8$$

in the formula (I), $R^1$ to $R^8$ each represent an alkyl group having 1 to 6 carbon atoms or an aryl group having 6 to 12 carbon atoms, while these may be identical to or different from each other; $X^1$ and $X^4$ each represent a group having a functional group which reacts with the active terminal of the active conjugated diene-based polymer chain, or an alkyl group having 1 to 6 carbon atoms or an aryl group having 6 to 12 carbon atoms, while $X^1$ and $X^4$ may be identical to or different from each other; $X^2$ represents a group having a functional group which reacts with the active terminal of the active conjugated diene-based polymer chain; $X^3$ represents a group containing 2 to 20 repeating units of alkylene glycol, or may partly represent a group derived from a group containing 2 to 20 repeating units of alkylene glycol; m represents an integer of 3 to 200; n represents an integer of 0 to 200; and k represents an integer of 0 to 200;

[Chemical Formula 5]

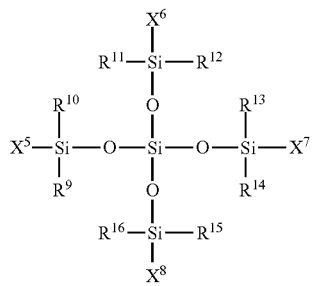

(II)

in the formula (II), $R^9$ to $R^{16}$ each represent an alkyl group having 1 to 6 carbon atoms or an aryl group having 6 to 12 carbon atoms, while these may be identical to or different from each other; and $X^5$ to $X^8$ each represent a group having a functional group which reacts with the active terminal of the active conjugated diene-based polymer chain; and

[Chemical Formula 6]

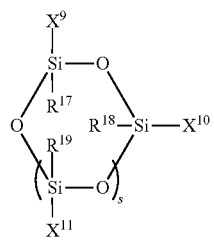

(III)

in the formula (III), $R^{17}$ to $R^{19}$ each represent an alkyl group having 1 to 6 carbon atoms or an aryl group having 6 to 12 carbon atoms, while these may be identical to or different from each other; and $X^9$ to $X^{11}$ each represent a group having a functional group which reacts with the active terminal of the active conjugated diene-based polymer chain; and s represents an integer of 1 to 18.

3. The rubber composition for tire tread according to claim 1, wherein the functional group which interacts with the silica is at least one selected from the group consisting of an alkoxysilyl group, a hydroxyl group, an aldehyde group, a carboxyl group, an amino group, an imino group, an epoxy group, an amido group, a thiol group, and an ether group.

4. The rubber composition for tire tread according to claim 1, wherein the terminal modifying group-containing conjugated diene-based copolymer has, as the functional group which interacts with the silica, a hydroxyl group and at least one selected from the group consisting of an alkoxysilyl group, an aldehyde group, a carboxyl group, an amino group, an imino group, an epoxy group, an amido group, a thiol group, and an ether group.

5. The rubber composition for tire tread according to claim 1, wherein the diene-based rubber further includes a diene-based rubber other than the terminal modifying group-containing conjugated diene-based copolymer.

6. The rubber composition for tire tread according to claim 5, wherein the diene-based rubber includes the diene-based rubber other than the terminal modifying group-containing conjugated diene-based copolymer in an amount of 70 wt % or less of a total amount of the diene-based rubber.

7. A pneumatic tire including a tread made of the rubber composition for tire tread according to claim 1.

8. The rubber composition for tire tread according to claim 1, which consists essentially of the diene-based rubber including the terminal modifying group-containing conjugated diene-based copolymer, the silica, the carbon black, the silane coupling agent or agents, a vulcanizing agent or a crosslinking agent, a vulcanization accelerating agent, an antioxidant, a plasticizer, a processing aid, and zinc oxide.

* * * * *